H. A. SCOTT.
TIRE TESTING AND INFLATING GAGE.
APPLICATION FILED FEB. 14, 1917.
1,318,113.
Patented Oct. 7, 1919.
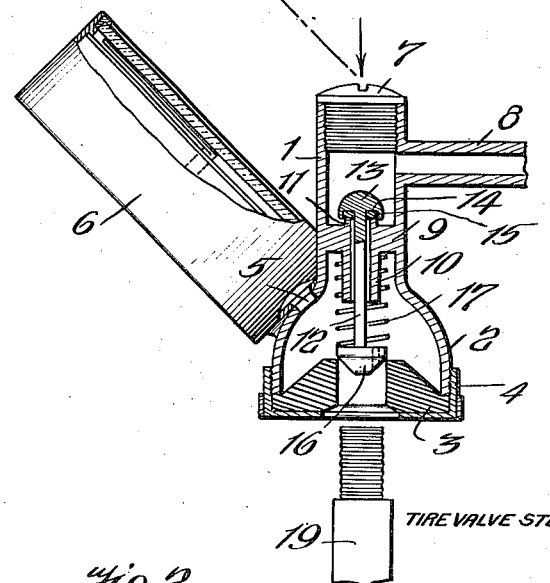
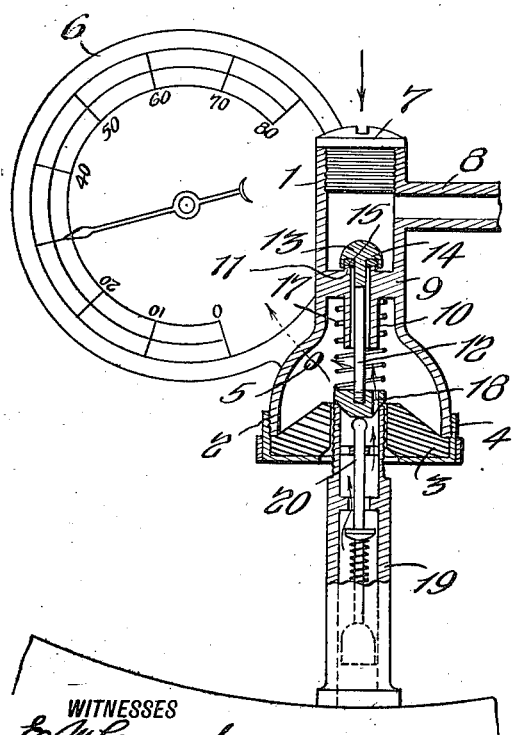
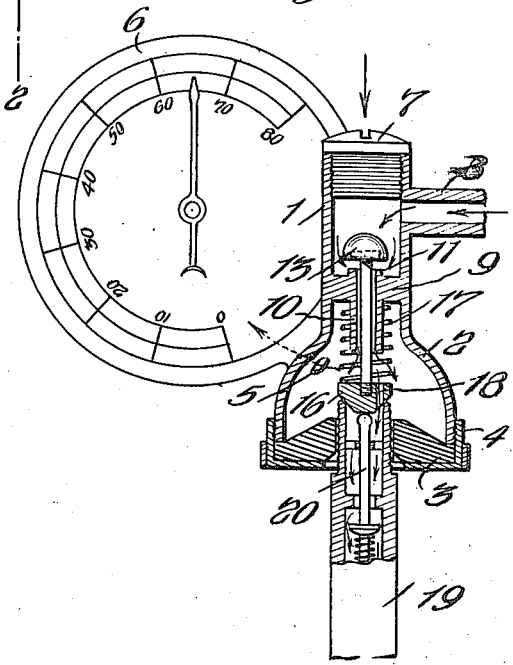
WITNESSES
INVENTOR
HARRY A. SCOTT,
BY
ATTORNEYS

UNITED STATES PATENT OFFICE.

HARRY ATWOOD SCOTT, OF BERKELEY, CALIFORNIA.

TIRE TESTING AND INFLATING GAGE.

1,318,113.　　　　　　Specification of Letters Patent.　　　Patented Oct. 7, 1919.

Application filed February 14, 1917. Serial No. 148,651.

*To all whom it may concern:*

Be it known that I, HARRY ATWOOD SCOTT, a citizen of the United States, and a resident of Berkeley, in the county of Alameda and State of California, have invented an Improvement in Tire Testing and Inflating Gages, of which the following is a specification.

My invention is an improvement in tire testing and inflating gages, and has for its object to provide a device of the character specified, by means of which a tire may be tested, and if the pressure is not sufficient, it may be inflated or deflated without removing the gage, the gage at the same time continuously registering the pressure, and wherein a normally closed passage is provided for connecting the gage with a reservoir or pump, the said passage being controlled by a valve which is opened by the pressure of the valve stem of the tire valve, the gage being at all times directly connected with the tire valve.

In the drawings:

Figure 1 is a vertical section through the gage casing.

Fig. 2 is a section at right angles to Fig. 1 showing the position of the parts when testing the pressure.

Fig. 3 is a similar view showing the position of the parts when inflating.

In the present embodiment of the invention a casing 1 is provided having a bell-shaped enlargement 2 at one end, and a rubber packing washer 3 is held within the bell, by means of a retaining ring 4, threaded onto the casing. This washer is designed to form a seal around the tire valve casing when the said casing is inserted in the bell through the opening of the washer.

A lateral passage or port 5 leads from the bell near its junction with the casing, and at this point a suitable gage 6 is arranged. The opposite end of the casing 1 is closed by a threaded plug 7, and near the said end the casing has a lateral inlet 8 for connection with a reservoir or pump. The body of the casing 1 is separated from the bell by a partition 9, the said partition having a central opening, and the partition is provided with a tubular extension 10 below the partition and with a tubular extension 11 above the partition, the said extension 11 forming a valve seat.

A valve stem 12 is mounted to move in the port and extension, and the said stem is provided with a valve 13 at its upper end. The face of the valve 13 adjacent to the extension 11 is cut away or cored, as shown at 14, and a suitable packing 15 is arranged within this cored portion and the packing coöperates with the extension 11 before-mentioned, to form a closure or seal at the port. A head 16 is threaded onto the lower end of the stem 12, and this head 16 is adapted to engage the end of the tire valve casing. A coil spring 17 encircles the tubular extension 10 between the partition and the head 16, and normally presses the stem and the valve 13 and head 16 downward, thus closing the port within the extension 11. The head 16 has a port or vent 18, through which the air may pass to the gage when testing.

The diameter of the valve stem 12 is such that the area between the opening in the extension 10 and the stem 12 is less than the inlet opening of the tire valve so that at all times the gage registers the true tire pressure and not that of the incoming air from the reservoir or pump.

The operation of the device is as follows:

When it is desired to test the pressure of a tire, the parts are arranged as shown in Fig. 2, the bell being engaged with the end of the tire valve casing 19, and with the washer 3 forming a seal. The casing 1 is pressed toward the tire casing until the head 16 seats on the end of the tire valve casing. At this time the stem 12 will engage and move the stem 20 of the tire valve, opening the tire valve, and the pressure in the tire will pass through the port 18 into the bell chamber 2 and will actuate the gage to indicate the pressure.

Should, for instance, the gage show a pressure of thirty pounds, and it be desired to raise the pressure, it is only necessary to move the gage a little farther down upon the tire valve casing. This further movement of the gage will move the valve stem 12 against the resistance of the spring 17, and will move the valve 13 and open the port in the partition 9, thus permitting air to flow from the reservoir or pump through the gage casing into the tire, and throughout the inflating of the tire the pressure will be indicated.

With the improved construction of gage, the pressure in the tire is shown as soon as the gage is engaged, and the entire operation of testing the pressure and inflating the tire is accomplished at one operation under the complete control of the operator, with the pressure at all times visible.

I claim:

1. A combined testing and inflating gage, comprising a casing having at one end a bell extension having means for receiving a tire valve casing and for sealing the space between the said casing and the bell, a registering gage constantly communicating with the bell, said casing having a lateral inlet for connection with a reservoir or pump, a partition between the inlet and the bell and having a central port, a valve stem movable in the port and having a valve between the partition and the inlet for closing the port, a head at the other end for engaging the tire valve casing when it is inserted in the bell, said head having a port for permitting the passage of air from the tire, and a spring normally moving the stem in a direction to close the valve.

2. A combined testing and inflating gage, comprising a casing having means at one end for permitting the entrance of a tire valve casing and having at the other end means for connecting the casing with a source of pressure, a partition between the ends of the casing and having a port, a valve for normally closing the said port, said valve having a stem passing through the port and provided with a head for engaging the end of the tire valve casing to permit the said valve to be opened by the pressure of the casing, and a spring normally holding the valve closed, said casing having gage mechanism constantly communicating with the casing between the partition and the engaging means for the tire valve.

3. A combined testing and inflating gage, comprising a casing having an opening at one end for receiving a tire valve and having an inlet at the other end for connection with a source of fluid under pressure, a valve seat intermediate the ends of the casing, a valve stem extending through the casing and having a head at its lower end for engaging the tire valve casing and tire valve stem to open the valve, and having a port for the passage of air, a valve on the other end of the stem for coöperating with the valve seat, and a spring normally holding the valve closed, said gage casing having a registering gage constantly communicating therewith adjacent to the first-named end of the casing.

4. A combined testing and inflating gage, comprising a casing having one end open for receiving a tire valve and having a gage constantly communicating with the casing adjacent to the said end and having an inlet at the opposite end for connection with a source of fluid under pressure, a valve normally closing the communication between the inlet and the registering gage, and having means for engaging the stem of the tire valve to open the same, and having means for engaging the tire valve casing to open the valve of the gage, said valve being normally spring closed.

5. A combined testing and inflating gage, comprising a casing having an opening at one end for receiving a tire valve and having a registering gage constantly communicating with the casing adjacent to the said end, and having an inlet for fluid under pressure at the opposite end, a valve normally closing the communication between the inlet and the registering gage, and means in connection with the valve for engaging the stem of the tire valve to open the same and for engagement by the end of the tire valve and casing to open the valve in the gage casing.

6. A combined tire testing gage and inflating device comprising a casing having an opening to receive a tire valve stem, a registering gage in constant and direct communication with the casing and the stem, a partition in said casing at a point above the communicating opening of the gage and into which air under pressure is delivered and a valve member normally preventing communication through the partition wall but which may be opened by added pressure of the device upon the tire stem.

7. A combined tire testing gage and inflating device, comprising a casing adapted to receive a tire valve stem, a registering gage fixed to said casing and in constant and direct communication with the stem, an air-receiving chamber formed within the casing and to which air under pressure may be delivered, and a valve normally preventing communication between the air-receiving chamber and the gage and which may be actuated by added pressure on the casing to establish communication therebetween.

8. A combined testing gage and inflating device comprising a casing having an upper and lower air chamber separated by a partition wall, a valve controlling the passage of air from the upper to the lower chamber, a tire stem receiving member across the lower chamber and through which the stem of the tire extends, a gage in constant communication with the lower chamber whereby the air pressure therein may be continuously indicated and a valve operating member adapted to establish communication between the two chambers of the casing when pressed against the end of the tire stem.

9. A combined testing gage and inflating device comprising a casing having a bell-shaped lower chamber and a separate upper chamber into which air under pressure is delivered, an end wall in the lower portion of the casing through which a tire stem may extend, a valve member controlling communication between the two chambers of the casing, means for normally holding said valve closed, an operating head upon the valve member adapted to be encountered by the tire stem to open the valve, said head being provided with a by-pass opening establishing communication between the tire and the bell-shaped chamber without effecting the opening of the valve and a pressure gage in direct communication with said lower chamber and adapted to constantly register the air pressure therein irrespective of the condition of the valve.

10. A valve body having two chambers one communicating with an air supply, the other communicating with a pressure gage and adapted to be connected to a tire valve, a passage between said chambers controlled by a valve, said valve having a stem adapted to contact with the tire valve when the body is connected to the tire valve whereby the tire valve is first opened to establish communication between the tire and the gage and the other valve is next opened to establish communication between the air supply and the tire.

HARRY ATWOOD SCOTT.

Witnesses:
W. A. SHIPE,
G. H. GRAFF.